United States Patent
Lo et al.

(10) Patent No.: US 8,882,164 B1
(45) Date of Patent: Nov. 11, 2014

(54) ANIMAL PET WASTE COLLECTOR AND STORAGE CONTAINER

(71) Applicants: Yu-Lin Lo, Taipei (TW); Chia-Chun Lo, Taipei (TW); Chia-Jing Lo, Taipei (TW); Wu-Xiang Liu, Taipei (TW); Dong-Ying Jeng, Taipei (TW)

(72) Inventors: Yu-Lin Lo, Taipei (TW); Chia-Chun Lo, Taipei (TW); Chia-Jing Lo, Taipei (TW); Wu-Xiang Liu, Taipei (TW); Dong-Ying Jeng, Taipei (TW)

(*) Notice: Subject to any disclaimer, the term of this patent is extended or adjusted under 35 U.S.C. 154(b) by 53 days.

(21) Appl. No.: 13/902,861

(22) Filed: May 27, 2013

(51) Int. Cl.
*A01K 29/00* (2006.01)
*A01K 23/00* (2006.01)

(52) U.S. Cl.
CPC .................................. *A01K 23/005* (2013.01)
USPC ......................................................... 294/1.5

(58) Field of Classification Search
CPC ..................... E01H 1/1206; E01H 2001/1293; E01H 2001/126; E01H 2001/128; A01K 23/005; A01K 1/0107; A01K 1/0114; A01K 1/011

USPC ............. 294/1.3, 1.4, 1.5, 209; 119/161, 867; D30/162

See application file for complete search history.

(56) References Cited

U.S. PATENT DOCUMENTS

| 6,554,335 | B1 * | 4/2003 | Kelly et al. | 294/15 |
| 7,040,677 | B1 * | 5/2006 | Wickser, Jr. | 294/1.4 |
| 7,246,575 | B2 * | 7/2007 | Goto | 119/802 |
| 7,281,740 | B1 * | 10/2007 | Fields | 294/100 |
| 7,287,790 | B1 * | 10/2007 | Kitiashvili | 294/1.4 |

* cited by examiner

*Primary Examiner* — Stephen Vu

(57) ABSTRACT

The purpose of the present invention is to provide an Animal Pet Waste Collector and a Waste Storage Container. The Animal Pet Waste Collector includes an Operation Stick and a Waste-collecting Bag connected at the front of said Operation Stick. Said Waste-collecting Bag comprises of a Bag and a Ring Frame, with a protruding Fork Lever on the Ring Frame that can be inserted in the Operation Stick's Front End's Socket and clamped. When the User presses a Button on the Operation Stick's Rear End with their fingers, the Fork Lever would detach from the Operation Stick's Socket and cause the Waste-collecting Bag into the trashcan, accomplishing the purpose of collecting animal pet waste in an easy way and fulfilling the environmental needs of keeping the ground waste-free.

9 Claims, 7 Drawing Sheets

ANIMAL PET WASTE COLLECTOR AND STORAGE CONTAINER

FIELD OF THE INVENTION

The present invention relates to an Animal Pet Waste Collector and Storage Container, particularly to an eco-friendly Animal Pet Waste Collector that is easy to carry and dispose, with a Storage Bucket for storing multiple Waste-collecting Bags.

BACKGROUND OF THE INVENTION

With more and more people raising pets nowadays, it is now quite common to see people walking with their animal pets around as to improve their relationships. However, to pets that have no sense of self-management, when they feel the need to relieve themselves, they settle it on the spot. Their waste droppings are not only a hazardous sight, the smell is also unbearable, along with a deep impact on the environment. To resolve the aforementioned problems, the pets' owners often carry with them newspaper, paper tissues, plastic bags, or other cleaning tools to clean up their pets' waste droppings. While these efforts are beneficial to the environmental protection, they still cannot resolve the need on keeping the ground waste-free. Although there have been earlier inventions of Animal Pet Waste Collectors, they were unable to become universalized due to the following problems: complicated structuring, easy to damage, high cost, less effectiveness, hard to operate, and difficult to carry etc.

In response to the aforementioned problems, how to design an Animal Pet Waste Collector that is easily structured, hard to damage, low cost, highly effective, easy to operate, and easy to carry, has become the main problem for the present invention to improve.

SUMMARY OF THE INVENTION

The purpose of the present invention is to provide an Animal Pet Waste Collector that is simple structured, highly effective, easy to operate and carry, along with a Waste Storage Container for storing Waste-collecting Bags.

To achieve the object mentioned above, the following technical solution is shown in the following descriptions:

Present invention provides an Animal Pet Waste Collector, which comprises:

An Operation Stick and a Waste-collecting Bag connected at the front of said Operation Stick, which is characterized in that:

Said Operation Stick is a long tube, one end as the Front End, and the other end is the Rear End. Said Front End serves to connect with the Waste-collecting Bag, with a Socket located on the fringe of said Front End to let the Waste-collecting Bag's Ring Frame's Fork Lever to be inserted in, said Rear End connects with the Handle for the User to hold.

The First Shrapnel is disposed inside said Socket of said Front End of the

Operation, which is a flexible sloped plate, with a Fixed Plate extended from one end and fixed on the inner wall of said Socket, the other end has a Clamping Plate used to clamp said Fork Lever.

The Second Shrapnel is disposed inside said Operation Stick's Rear End, is a flexible sloped plate with a Fixed Plate extended from one end, and the other end has a Pressing Plate.

A Button, which is installed on said Operation Stick's Rear End, is shuttled in the Rear End's Perforation, with the upper end is protruding from said Perforation, the Column on lower end is hidden in said Perforation and connected with the Second Shrapnel's Pressing Plate.

A Cable Wire, which is hidden inside the tube of said Operation Stick, wherein one end is connected with the First Shrapnel's Clamping Plate, and the other end is connected with the Second Shrapnel's Pressing Plate.

Several Cable Rings are hidden inside the tube of said Operation Stick and cross-correspond with each other inside the tube's inner wall, for said Cable Wire to penetrate through.

Present invention also provides a Waste-collecting Bag to be used correspondingly with said Animal Pet Waste Collector, which is comprised of: a Bag and a Ring Frame fixed on the opening of said Bag. Said Ring Frame has a protruding Fork Lever that can be inserted in the Socket on the Operation Stick's Front End and clamped by the First Shrapnel's Clamping Plate.

Compared to the present techniques, the present invention's abilities, effects, and functions are as follows:

1. The Structure of the Animal Pet Waste Collector is simple, only by inserting the Waste-collecting Bag's Fork Lever into the Operation Stick's Front End to assemble them, the connection between them is stable, un-detachable, hence makes present invention become easy to carry, also easy for the User to pick up the Animal Pet Waste from behind without worrying about their dogs taking a shit randomly.
2. If the User has the need to leave the Waste-collecting Bag, only by press a Button, the Waste-collecting Bag would be easily detached from the Operation Stick and fall into the Garbage Can, eliminating the need of holding the Waste-collecting Bag by hand, which makes the wasting process more hygiene and safe.
3. Said Waste-collecting Bag is made by a material that is easily dissolvable, such as Polylactide (PLA) or dissolvable paper, as they can self-dissolve under the suitable temperature and environment and be returned to nature without causing environmental damage.
4. Said Waste-collecting Bag's Ring Frame is oval-shaped, making it easy for the User to collect the Animal Pet Waste without having the Animal to over-extend its legs.
5. The Fork Lever of the Storage Container is protruding from the Ring Frame of said Container, therefore, makes it easy for the User to insert the Fork Lever into the Socket on the Operation Stick's Front End, making the operation of present invention becomes more easy and convenient.

DETAILED DESCRIPTION OF PREFERRED EMBODIMENT

Figure 1:
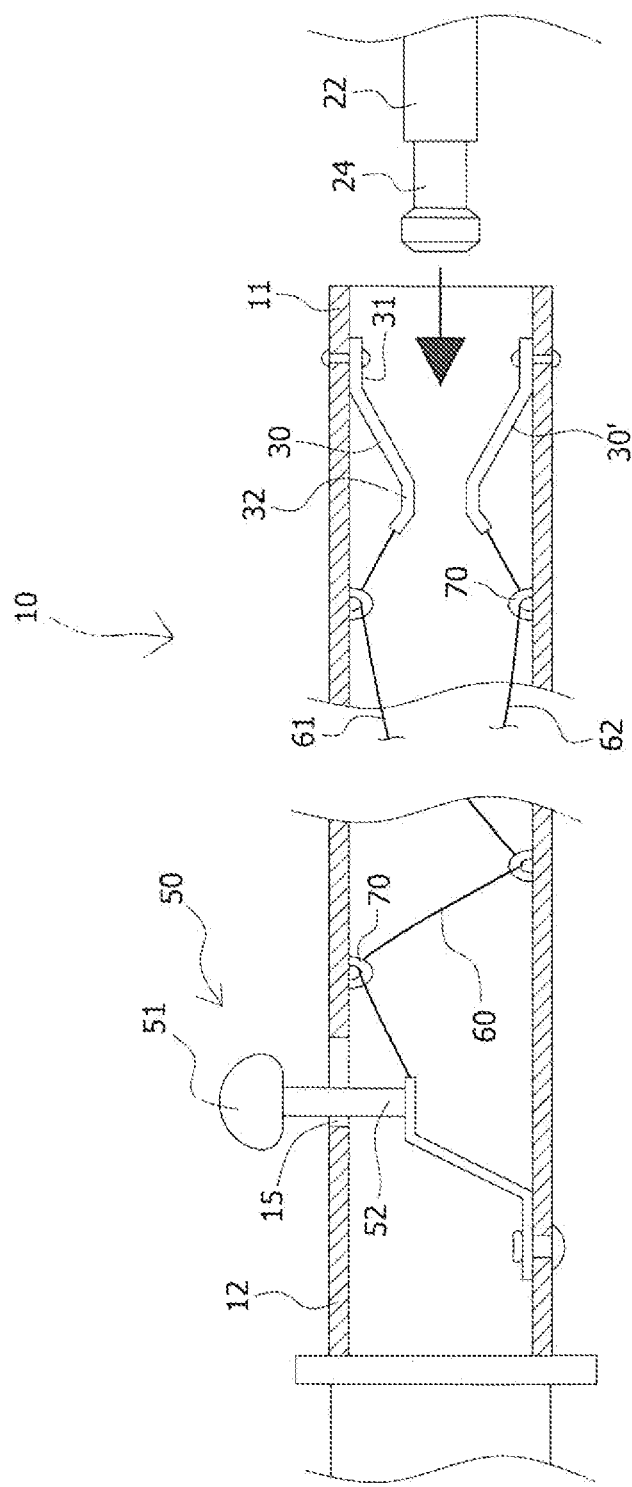
FIG. 1: The vertical cross section view of the assembling structure between Operation Stick and Waste-collecting Bag.
Figure 2:
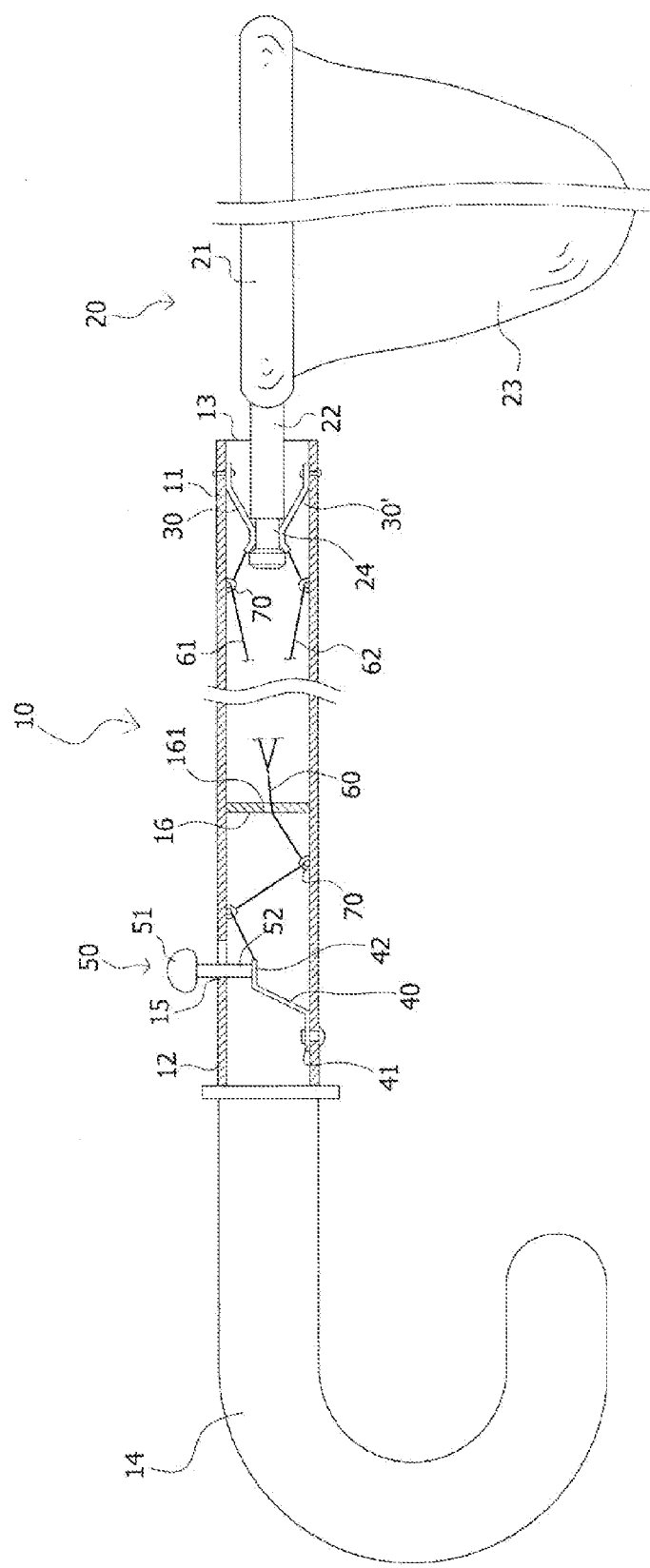
FIG. 2: The vertical cross section view of the connected assembling structure between Operation Stick and Waste-collecting Bag.
Figure 3:
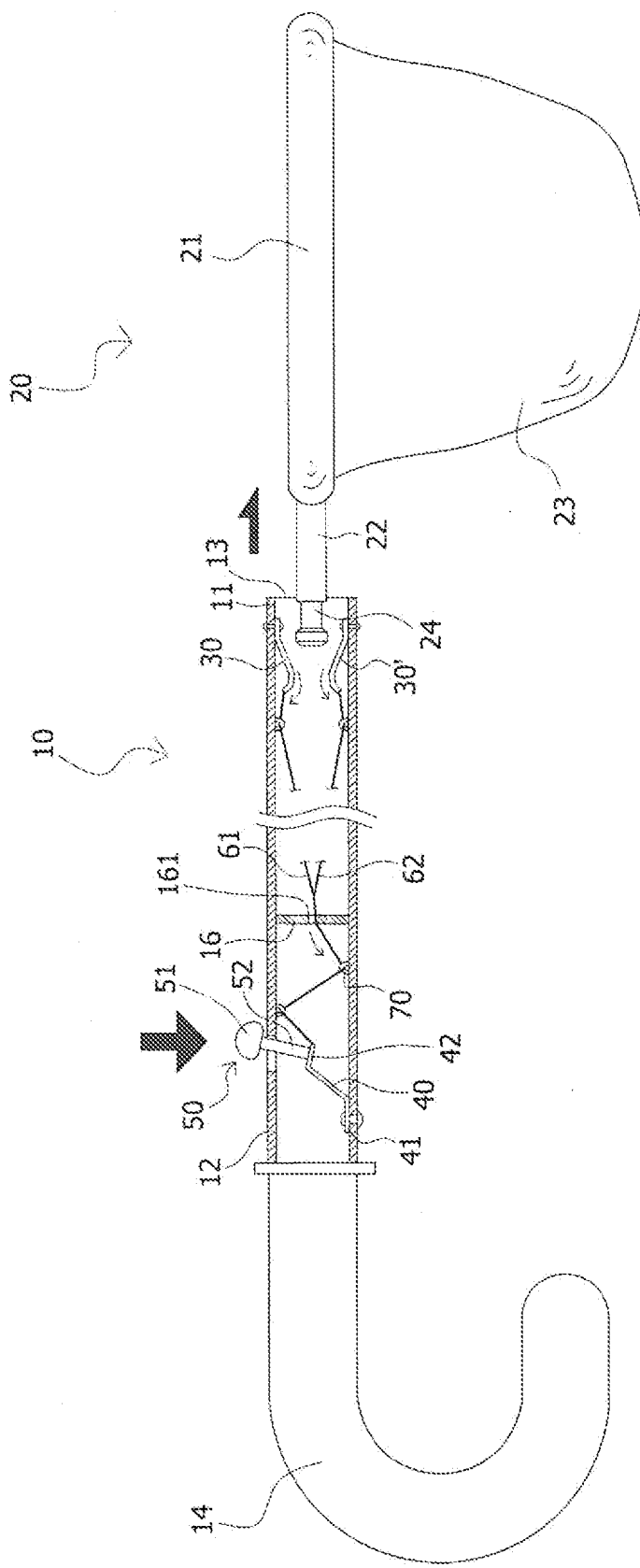
FIG. 3: The vertical cross section view of the detached assembling structure between Operation Stick and Waste-collecting Bag.
Figure 4A:
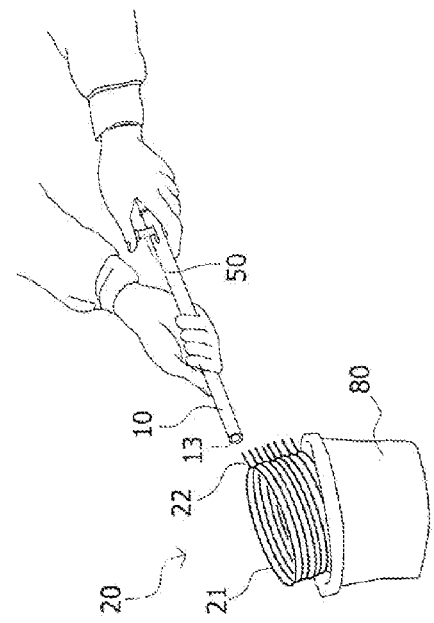
FIG. 4A-4D: Scheme of the using of the present invention.
Figure 4C:
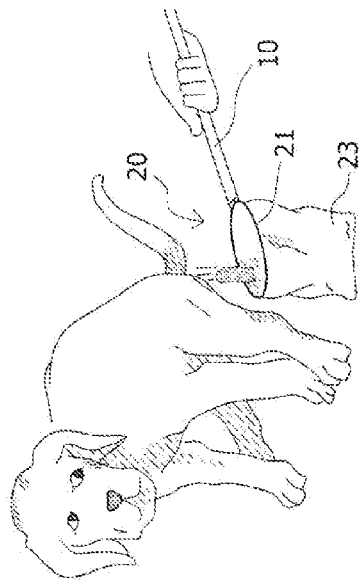
Figure 4B:
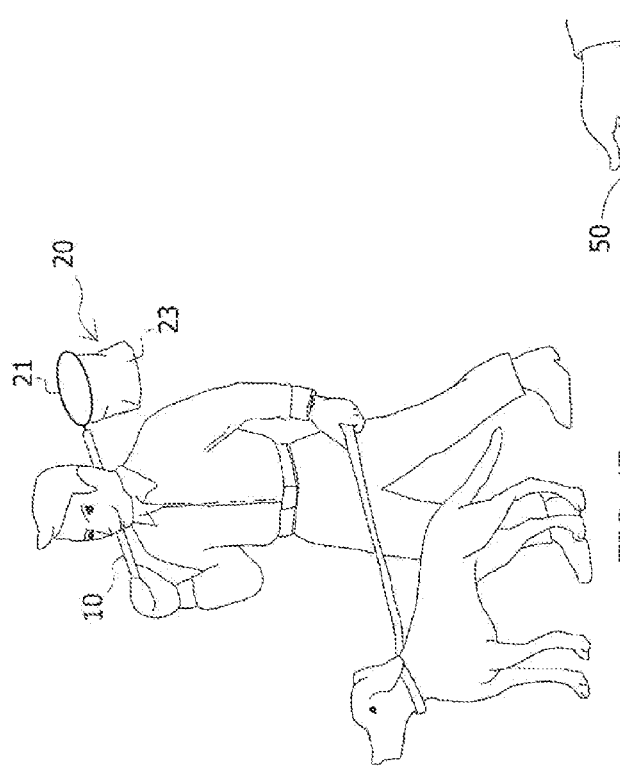
Figure 4D:
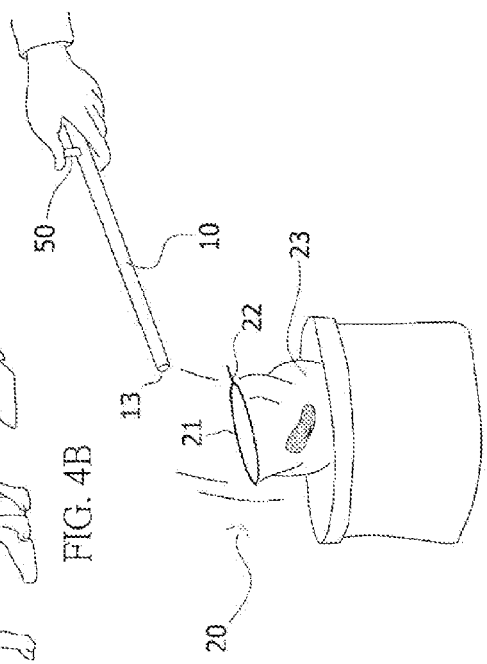

The Detailed Description of the Preferred Embodiments for the present invention are shown in the following drawings and descriptions:

As shown in FIG. 1-3, the present invention reveals an Animal Pet Waste Collector, which includes an Operation Stick (10) and a Waste-collecting Bag (20) connected at the front of said Operation Stick (10).

Said Operation Stick (10) is a long tube, with one end as the Front End (11), and the other end as the Rear End (12). Said Front End (11) serves to connect with the Waste-collecting Bag (20), with a Socket (13) located on the fringe of said Front End (11) to let the Waste-collecting Bag's (20) Ring Frame's (21) Fork Lever (22) being inserted in, said Rear End (12) connects with the Handle (14) for the User to hold.

The First Shrapnel (30) is disposed inside the Socket (13) of said Operation Stick's (10) Front End (11), which is a flexible sloped plate with a Fixed Plate (31) extended from one end and fixed on the inner wall of said Socket (13), and the other end has a Clamping Plate (32) used to clamp said Fork Lever (22).

The Second Shrapnel (40) is disposed inside said Operation Stick's Rear End (10), which is a flexible sloped plate with a Fixed Plate (41) extended from one end, and the other end has a Pressing Plate (42).

A Button (50) is installed on said Operation Stick's (10) Rear End (12) and shuttled in the Rear End's (12) Perforation (15), the upper end's Hilt (51) of said Button (50) is protruding from the Perforation (15), and the lower end's Column (52) of said Button (50) is hidden under the Perforation (15) and connected with the Second Shrapnel's (40) Pressing Plate (42).

A Cable Wire (60), which is hidden inside the tube of said Operation Stick (10), has one end connected with the First Shrapnel's (30) Clamping Plate (32), and the other end connected with the Second Shrapnel's (40) Pressing Plate (42).

Also, several Cable Rings (70) are hidden inside the tube of said Operation Stick (10) and cross-correspond with each other in the tube's inner wall, allowing said Cable Wire (60) to penetrate through. Said Cable Rings' (70) abilities are that they guide the Cable Wire (60) and pull the First Shrapnel (30) when the Button (50) is pressed.

Said Waste-collecting Bag (20) is comprised of a Bag (23) and a Ring Frame (21) fixed on the Bag's opening. Said Ring Frame (23) has a protruding Fork Lever (22) that can be inserted in the Jack (13) on the Operation Stick's (10) Front End and clamped by the First Shrapnel's (30) Clamping Plate (32).

As shown in the Figs, said Operation Stick's (10) Front End has installed two First Shrapnels (30) (30') that are symmetric to each other, with two Lead Wires (61) (62) split from one end of said Cable Wire (60) and penetrating through two Cable Rings (70), then connect the Clamping Plate (32) from said two First Shrapnels (30) (30'). Through this design, the Waste-collecting Bag's (20) Fork Lever (22) would be clamped tightly and the Waste-collecting Bag (20) won't sway in the front of the Operation Stick (10).

To allow said two First Shrapnels (30) (30') to move simultaneously, said Operation Stick's (10) tube has a Vane (16) with a Perforation (161) at its center for said Cable Wire (60) to penetrate through, then said Cable Wire (60) splits into the two Lead Wires (61) (62) and connecting with the Clamping Plates (32) of said two First Shrapnels (30) (30') separately. The Cable Wire's (60) other end is still connected with the Second Shrapnel's (40) Pressing Plate (42). Thus, the two First Shrapnels (30) (30') can be controlled simultaneously when the Button (50) is pressed.

The protruding Fork Lever (22) of said Waste-collecting Bag (20) has a Positioning Ring Groove (24). Thus, the First Shrapnel's (30) Clamping Plate (32) would be guided into the Positioning Ring Groove (24) and clamped tightly, Also, the Fork Lever (22) can guide the First Shrapnel's' (30) Clamping Plate (32) into the Socket (13) from any angle, so the attaching angle of said Fork Lever (22) is less limited.

As mentioned above, said Cable Rings (70) cross-correspond with each other in said Operation Stick's (10) tube. The two Cable Rings (70) that are closest to the two First Shrapnels (30) (30') are best when vertically-corresponded with the two First Shrapnels (30) (30'), because they can cause the two Lead Wires (61) (62) to pull the two First Shrapnels (30) (30') vertically. However, noting the Operation Stick's (10) narrow interior, it is best performed in the diagonally set as shown in the Fig.

Also, as an emphasis on Environmental protection, the Waste-collecting Bag (20) is made by either dissolvable Polylactide (PLA) or dissolvable paper, as they can self-dissolve under the suitable temperature and environment and be returned to nature without causing environmental damage.

Also, said Waste-collecting Bag's (20) Ring Frame (21) is an oval-shape that does not need the Animal to over-extend its legs to relieve themselves and convenient for the User to pick up the Animal Pet Waste from behind.

To store the aforementioned Waste-collecting Bags (20), the present invention provides a Storage Container that has two Embodiments:

First Embodiment

Figure 5:
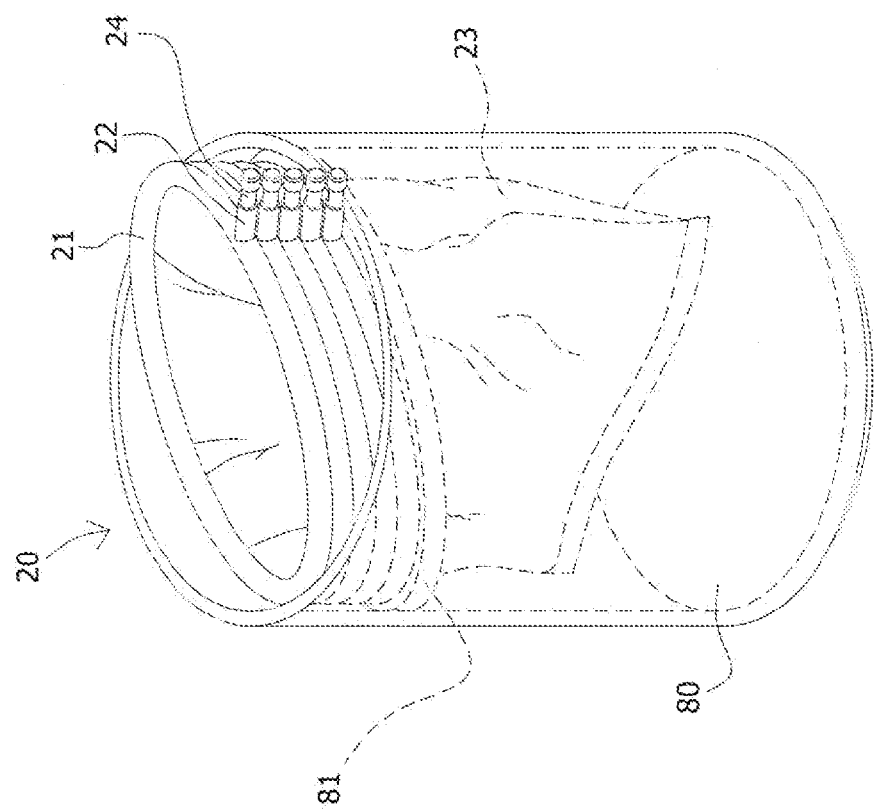
FIG. 5: Three-Dimensional view of Waste-collecting Bag's First type in the Storage Container.
Figure 6:
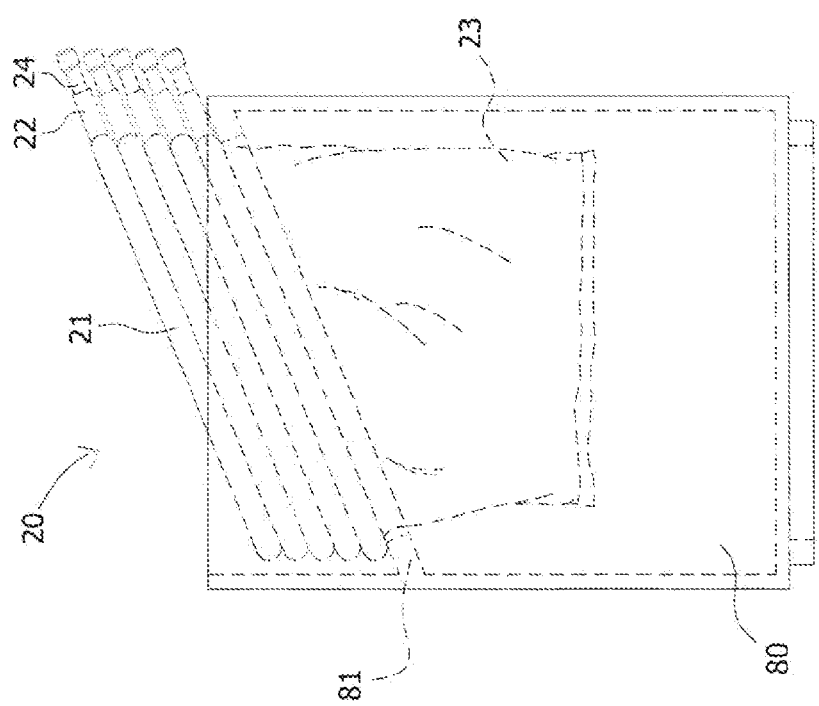
FIG. 6: Plan view of the Storage Container of FIG. 5.

FIGS. 5~6 reveal the Storage Container in its First Embodiment, in which said Storage Container is a Bucket (80) that provides storage for multiple Animal Pet Waste-collecting Bags (20), with its inner wall installed with a protruding, ring-shaped, Plastic Ring (81) that holds the Waste-collecting Bag's (20) Ring Frame (21). Said Plastic Ring (81) has one end pointing upward and the other end pointing downward, forming a diagonally set with its upward end horizontally with the Bucket's (80) top fringe.

The aforementioned diagonally set's Plastic Ring (81) can be used to support the Waste-collecting Bag's (20) Ring Frame (21) and exposing the Ring Frame's (21) Fork Lever (22) outside the Bucket, making it easy for the User to insert the Fork Lever (22) into the Socket (13) on the Operation Stick's (10) Front End, achieving the effect of being convenient and easy to combine.

Figure 7:
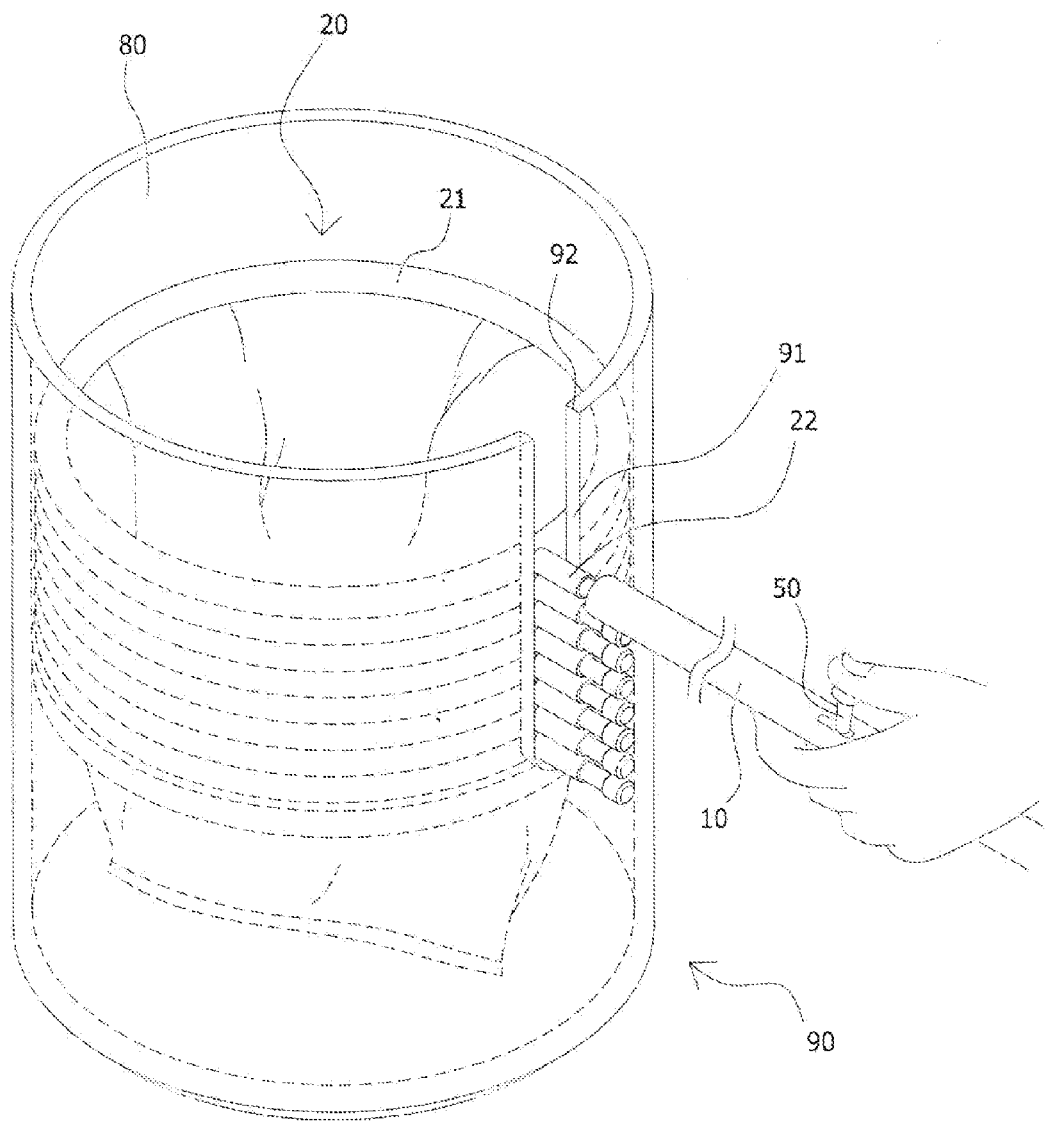
FIG. 7: Three-Dimensional view of Waste-collecting Bag's Second type in the Storage Container.

Also, FIG. 7 reveals the Storage Container in its Second Embodiment, in which said Storage Container, as a Bucket (80) that provides storage for multiple Animal Pet Waste-collecting Bags (20), has a vertical Notch (91) on said Bucket's wall. Said Notch's (91) lower end is a closed end while the upper end is an open Incision (92). Said Incision (92) is located on the Bucket's (80) top fringe to allow the protruding Fork Lever (22) on the Waste-collecting Bag's (20) Ring Frame (21) be inserted in the Notch (91) and expose the Fork Lever (22) outside the Bucket, making it easy for the User to insert the Fork Lever (22) into the Jack (13) on the Operation Stick's (10) Front End, achieving the effect of being convenient and easy to combine.

Figure 8:
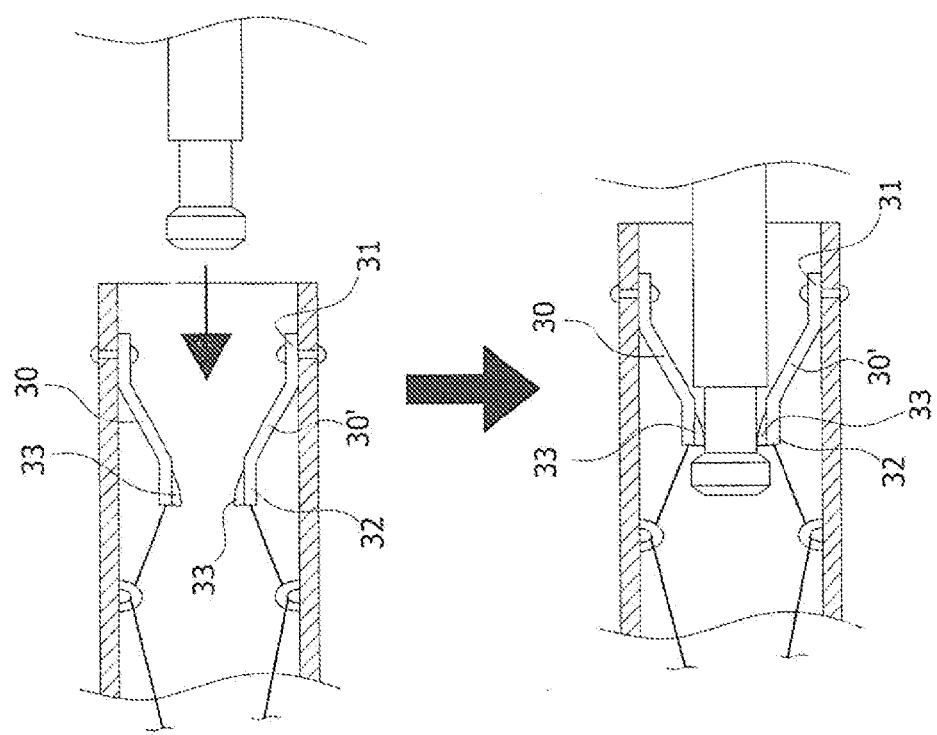
FIG. 8: The scheme of another Jamming State of the Operation Stick and Waste-collecting Bag.

As shown in FIG. 8, the Clamping Plate (32) of said First Shrapnels (30) (30') have a Latch (33) that can latch into the Positioning Ring Groove (24). When the Latch (33) has latched into the Positioning Ring Groove (24), a clinking sound would be heard, allowing the User to know that the Fork Lever (22) and the Operation Stick (10) are fixed in place. Said Clamping Plate (32) and Latch (33) are integrally molded and made of metal.

All that is described above and shown in the drawings is only the description of the preferred embodiment for introducing the present invention's abilities, effects, and functions, and is not to restrict the specific characteristic of present invention. Any improvements or changes by the scope of the present invention might comprise the features as claimed hereafter.

What is claimed is:

1. An animal pet waste collector, which comprises an operation stick (10) and a waste-collecting bag (20) connected at a front of said operation stick (10);

said operation stick (10) is a long tube, having a front end (11) and a rear end (12); said front end (11) has a socket (13) located on a fringe of said front edge (11) to let a fork lever (22) on a ring frame (21) of the waste-collecting bag (20) to be inserted in, while said rear end (12) connects with a handle (14) for a user to hold;

said socket (13) comprises at least one first shrapnel (30), which is disposed inside of said front end (11) of said operation stick (10), is a flexible sloped plate with a fixed plate (31) extended from one end and fixed on an inner wall of said socket (13), and another end has a clamping plate (32) used to clamp said fork lever (22);

a second shrapnel (40), disposed inside said rear end (10) of said operation stick, is a flexible sloped plate with a fixed plate (41) extended from one end, and another end has a pressing plate (42);

a button (50), which is installed on said rear end (12) of said operation stick (10), is shuttled in a perforation (15) in the rear end (12), with an upper end of a hilt (51) exposed outside the perforation (15), and a lower end of a column (52) hidden under the perforation (15) and connected with the pressing plate (42) of the second shrapnel (40);

a cable wire (60), which is hidden inside the tube of said Operation Stick (10), has one end connected with the clamping plate (32) of the first shrapnel (30), and another end connected with the pressing plate (42) of the second shrapnel (40);

several cable rings (70) are hidden inside the tube of said operation stick (10) and cross-correspond with each other inside an inner wall of the tube, allowing said cable wire (60) to penetrate therethrough; and said waste-collecting bag (20) is comprising a bag (23) and a ring frame (21) which is fixed on an opening of the bag; said ring frame (21) has said protruding fork lever (22) that can be inserted in the socket (13) on the front end of the operation stick (10) and clamped by the clamping plate (32) of the first shrapnel (30).

2. The animal pet waste collector as described in claim 1, wherein said front end of said operation stick (10) has two first shrapnels (30) (30') that are symmetric to each other, with two lead wires (61) (62) split from one end of the cable wire (60) and penetrating through two of the cable rings (70) to connect the clamping plate (32) to said two first shrapnels (30) (30').

3. The animal pet waste collector as described in claim 1, wherein said tube of the operation stick (10) has installed a vane (16) with another perforation (161) at its center for the cable wire (60) to penetrate through.

4. The animal pet waste collector as described in claim 1, wherein said protruding fork lever (22) has a positioning ring groove (24) for being inserted and fixed by said clamping plate (32).

5. The animal pet waste collector as described in claim 4, wherein said clamping plate (32) has a latch (33) for latching to said positioning ring groove (24).

6. The animal pet waste collector as described in claim 1, wherein the bag (23) is made of a material of one of the following: dissolvable Polylactide (PLA) or self-dissolvable paper.

7. The animal pet waste collector as described in claim 1, wherein said ring frame (21) is an oval-shape.

8. The animal pet waste collector as described in claim 1, further comprising a storage container being a bucket (80) for storing used waste-collecting bag (20), wherein the bucket having an inner wall with a protruding, ring-shaped, plastic ring (81) for supporting the ring frame (21); and one end of said plastic ring (81) is pointing up and another end pointing down, forming a diagonal position with its upward end and horizontal with a top fringe of the bucket.

9. The animal pet waste collector as described in claim 8, wherein said storage container has a vertical notch (91) on said inner wall of said bucket; a lower end of said notch is a closed end while an upper end of said notch is an open incision (92); said incision (92) is located on the top fringe of the bucket to allow the protruding fork lever (22) to be inserted in the notch (91).

* * * * *